United States Patent
Rodden et al.

(10) Patent No.: US 6,477,450 B2
(45) Date of Patent: Nov. 5, 2002

(54) NOISE SCREEN FOR ATTITUDE CONTROL SYSTEM

(75) Inventors: John J. Rodden, Los Altos, CA (US); Homer D. Stevens, Redwood City, CA (US); David P. Hong, Redwood City, CA (US); Philip C. Hirschberg, Fremont, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/782,644

(22) Filed: Feb. 13, 2001

(65) Prior Publication Data

US 2002/0111722 A1 Aug. 15, 2002

(51) Int. Cl.[7] .................................................. G06F 7/00
(52) U.S. Cl. ............................... 701/13; 701/4; 244/164
(58) Field of Search ........................... 701/1, 4, 10, 13; 342/355; 244/158 R, 164, 169, 172

(56) References Cited

U.S. PATENT DOCUMENTS 3,624,367 A * 11/1971 Hamilton et al. ............. 701/13

* cited by examiner

Primary Examiner—William A. Cuchlinski, Jr.
Assistant Examiner—Edward Pipala
(74) Attorney, Agent, or Firm—Perman & Green, LLP

(57) ABSTRACT

An attitude control system comprising a controller and a noise screen device coupled to the controller. The controller is adapted to control an attitude of a vehicle carrying an actuator system that is adapted to pulse in metered bursts in order to generate a control torque to control the attitude of the vehicle in response to a control pulse. The noise screen device is adapted to generate a noise screen signal in response to the control pulse that is generated when an input attitude error signal exceeds a predetermined deadband attitude level. The noise screen signal comprises a decaying offset signal that when combined with the attitude error input signal results in a net attitude error input signal away from the predetermined deadband level to reduce further control pulse generation.

13 Claims, 7 Drawing Sheets

NOISE SCREEN FOR ATTITUDE CONTROL SYSTEM

STATEMENT REGARDING FEDERALLY SPONSORED RESEARCH OR DEVELOPMENT

This invention was made with Government support under contract number: NAS7-260 awarded by NASA. The Government has certain rights in the invention.

BACKGROUND OF THE INVENTION

1. Field of the Invention

The present invention relates generally to an attitude control system for a vehicle, and, more particularly to a deadband mass expulsion attitude control system.

2. Brief Description of Related Developments

In the employment of spacecraft in a mission, such as the encirclement of the earth by a communications or scientific satellite, it is necessary to stabilize the attitude of the spacecraft. An adaptive mass expulsion attitude control system is described in U.S. patent application Ser. No.: 09/363,680, commonly assigned to the Assignee of the present invention and which is incorporated herein by reference. The stabilization is generally accomplished by overcoming the destabilizing torques of sources of disturbance to the stabilization of the spacecraft. Sources of destabilizing torque can include aerodynamic torques experienced by spacecraft travel in a low orbital path through residual atmosphere, solar torque caused by pressure from the sun, and torque induced by gravity gradient from the earth's gravitational field.

The attitude control system may employ thrusters that, upon activation, develop forces and moments that push the spacecraft back to the desired attitude. A thruster may be constructed to expel mass, such as ionized particles accelerated by an electrostatic field, or molecules of gas expelled from a canister of pressurized gas. In addition, a control system employed for attitude stabilization may employ magnetic forces, as by use of magnetic torquers. The magnetic torquers comprise rods of magnetic material encircled by coils excited with electric current provided by photocells onboard the spacecraft, wherein the magnetic forces of the coils interact with a relatively weak magnetic field of the earth. The interaction of these magnetic forces develops a torque that tends to aid in the attitude stabilization.

A thruster attitude control system operates by expelling gas in the form of pulses of the gas. In such a thruster, the compressed gas is contained in a canister. The canister of compressed gas communicates via a solenoid-operated valve to an exterior nozzle through which the expelled molecules of gas are directed into the environment outside the spacecraft. Use of the solenoid to open the valve during the time interval of the resulting jet, followed by a closing of the valve to terminate the jet of compressed gas, provides the desired impulse of the expelled gas.

Generally, in a control system, the pulses of the expelled gas have a predetermined duration. The repetition frequency of the pulses is sufficiently low such that information obtained from attitude sensors onboard a spacecraft can be employed to monitor and predict the progress in correction of the spacecraft attitude. Thereby, the pulses of expelled gas can be generated as needed for correction and/or stabilization of the spacecraft attitude. In a "deadband" mass expulsion attitude control system, gas pulses can be generated when attitude exceeds a deadband value. These types of systems generate control torques in the form of gas thrusters that pulse in metered bursts. The thrusters generally operate at full-on or full-off. The duration of the pulse can be controlled and maintains a minimum realizable size for small signals. The pulses can be formed in a modulator logic device that can determine when an input attitude error signal exceeds a pre-set value or range, which is referred to herein as the "deadband." The "deadband" generally describes an acceptable range for variances in the attitude of the vehicle. During steady-state operation, the system ideally pulses just often enough on one side to balance over time any external torque disturbance on the vehicle or spacecraft and keep the spacecraft attitude within the limits of the deadband. A difficulty ensues when there is noise on the attitude input error signal that is significant when compared to the range of the deadband, and particularly when the attitude input error signal is approaching a limit of the deadband range. The presence of noise on the attitude input error signal can cause the execution of multiple control pulses when the attitude input error signal is approaching or near the dead-band limit, since the signal noise can repeatedly exceed the deadband limit, which in turn causes the execution of a control pulse. The multiple control pulses induce extra control torques that generate acceleration that overdrives the attitude of the vehicle. After such accelerations, the attitude control of the vehicle can proceed to the opposite side of the deadband range where further control pulses reverse the motion. The resulting multiple control pulses over-accelerate the spacecraft into motion that causes excessive limit cycle mass usage. The noise stimulated control pulses cause non-efficient and more frequent expenditure of propellant.

SUMMARY OF THE INVENTION

The present invention is directed to, in a first aspect, an attitude control system. In one embodiment, the system comprises a controller and a noise screen device coupled to the controller. The controller is adapted to control an attitude of a vehicle carrying an actuator system that is adapted to pulse in metered bursts in order to generate a control torque to control the attitude of the vehicle in response to a control pulse. The noise screen device is adapted to generate a noise screen signal in response to the control pulse that is generated when an attitude error input signal exceeds a predetermined deadband attitude level. The noise screen signal comprises a decaying offset signal that when combined with the attitude error input signal results in a net attitude error input signal away from the predetermined deadband level to reduce further control pulse generation.

In one aspect, the present invention is directed to a method of reducing an undesirable response to signal noise for a mass expulsion spacecraft control system. In one embodiment, the method comprises generating a noise screen signal in response to an initial attitude control pulse. The noise screen signal comprises a decaying offset signal that when combined with the attitude error input signal results in a net attitude error input signal away from the predetermined deadband level to reduce further control pulse generation. The noise screen signal is combined with an input attitude control signal and a subsequent attitude control pulse based on the combined noise screen signal and input attitude control signal is generated. Each subsequent control pulse is adapted to generate additional superposed decaying functions.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
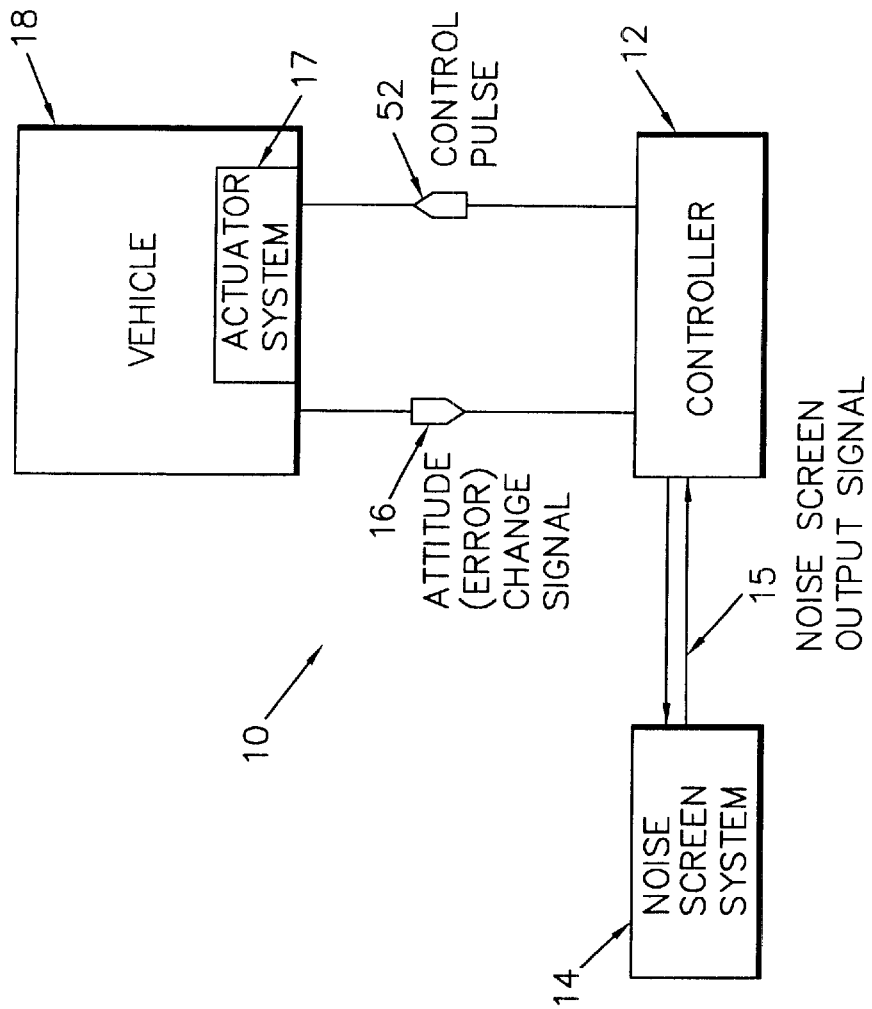
FIG. 1 is a block diagram of a system incorporating features of the present invention.

Referring to FIG. 1, there is shown a block diagram of a system 10 incorporating features of the present invention. Although the present invention will be described with reference to the embodiment shown in the drawings, it should be understood that the present invention could be embodied in many alternate forms of embodiments. In addition, any suitable size, shape or type of elements or materials could be used.

As shown in FIG. 1, the system 10 generally comprises a vehicle controller 12, a noise screen 14 and a vehicle 18. The controller 12 can be coupled to the noise screen 14. A signal 16 representing a change in a desired attitude of the vehicle is provided to the controller 12. The signal 16 can also be referred to as the attitude input error signal and is used to represent the deviation of the vehicle from a desired attitude. The controller 12 is generally adapted to control the attitude of the vehicle and can comprise a controller for an actuator system 17 that can use a thruster generating gas pulses for controlling the attitude of a vehicle. In one embodiment, the vehicle can comprise for example, a spacecraft. The controller 12 is adapted to generate and deliver a control pulse 52 to the actuator system 17 of vehicle 18 in order to make and control attitude changes. Although the present invention is described herein as being applied to a "spacecraft", any suitable vehicle adapted to carry and be controlled by an actuator system can be used. In an alternate embodiment, the vehicle controller 12 can comprise a controller for any suitable "bang-bang" actuator system. Examples of a "bang-bang" actuator system can include actuator systems using thrusters, stepper motors and thermal controls.

Figure 2:
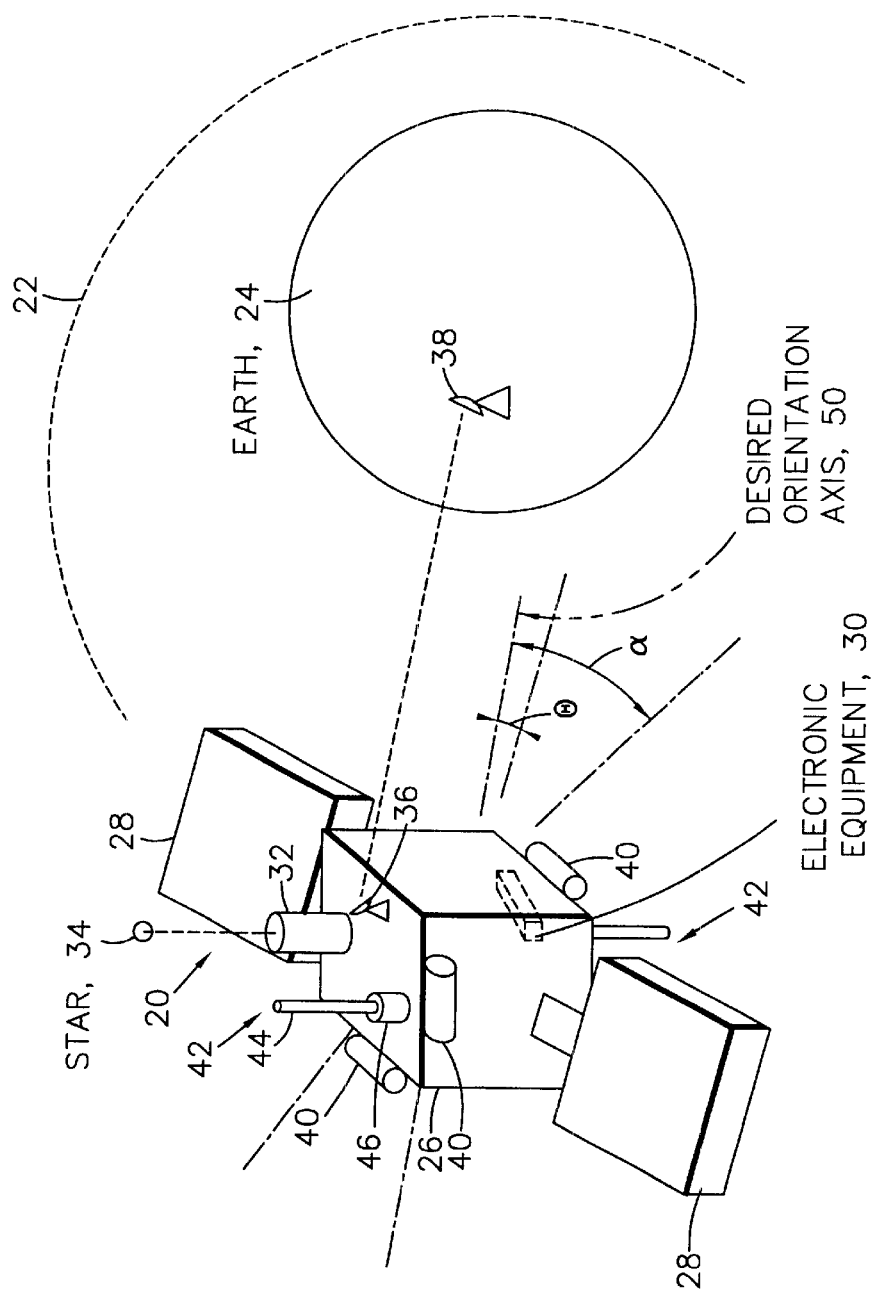
FIG. 2 is an elevational of a vehicle, shown as a spacecraft, having an attitude controlled in accordance with the invention.

FIG. 2 generally shows a spacecraft 20 traveling on an orbit 22 around the earth 24. The spacecraft 20 generally includes a body 26 which carries solar panels 28 for conversion of solar energy to electrical energy for powering electronic equipment 30 also carried within the body 26. A star tracker 32 can be disposed on the body 26 and is oriented towards a star 34. In a situation where the spacecraft 20 is serving a mission of a communications satellite, communication antennas, one such antenna being shown at 36, are positioned on the body 26 and directed toward the earth 24 for communication with ground-based stations, one such station being shown at 38. Compressed gas thrusters 40 can be mounted in various locations about the body 26, three of the thrusters 40 being shown by way of example. The thrusters 40 serve for orienting the spacecraft 20 in a desired attitude. Magnetic torquers 42 may also be carried onboard the spacecraft 20, and are mounted at various locations upon the body 26, two such torquers 42 being shown by way of example. A torquer 42 is shown as comprising a rod 44 of magnetic material with a coil 46 encircling the rod 44 to excite therein a magnetic field. In one embodiment, the magnetic fields of the torquers 42 interact with the earth's magnetic field to develop a torque for orienting the spacecraft 20 in a desired attitude.

Also shown in FIG. 2 are two axes 48 and 50 separated by an angle α. The axis 48 shows a stable attitude of the spacecraft 20, and the axis 50 shows a desired attitude of the spacecraft 20. For simplicity, FIG. 2 shows only a two dimensional representation of the spacecraft attitude. As shown in FIG. 1, the spacecraft 20 has the desired attitude and, accordingly, the axis 50 is directed from the spacecraft 20 towards the earth 24. In the event that the thrusters 40 and torquers 42 are not activated, disturbance such as gravity gradient, solar pressure and aerodynamic effects can cause the spacecraft to drift. Also shown is an angle illustrated by Θ that represents an angular deviation in the attitude of the spacecraft 20 from the desired orientation. The maximum value of the angle Θ represents an edge of an angular band of acceptable spacecraft attitude, namely the deadband, about the desired orientation axis 50.

Figure 3:
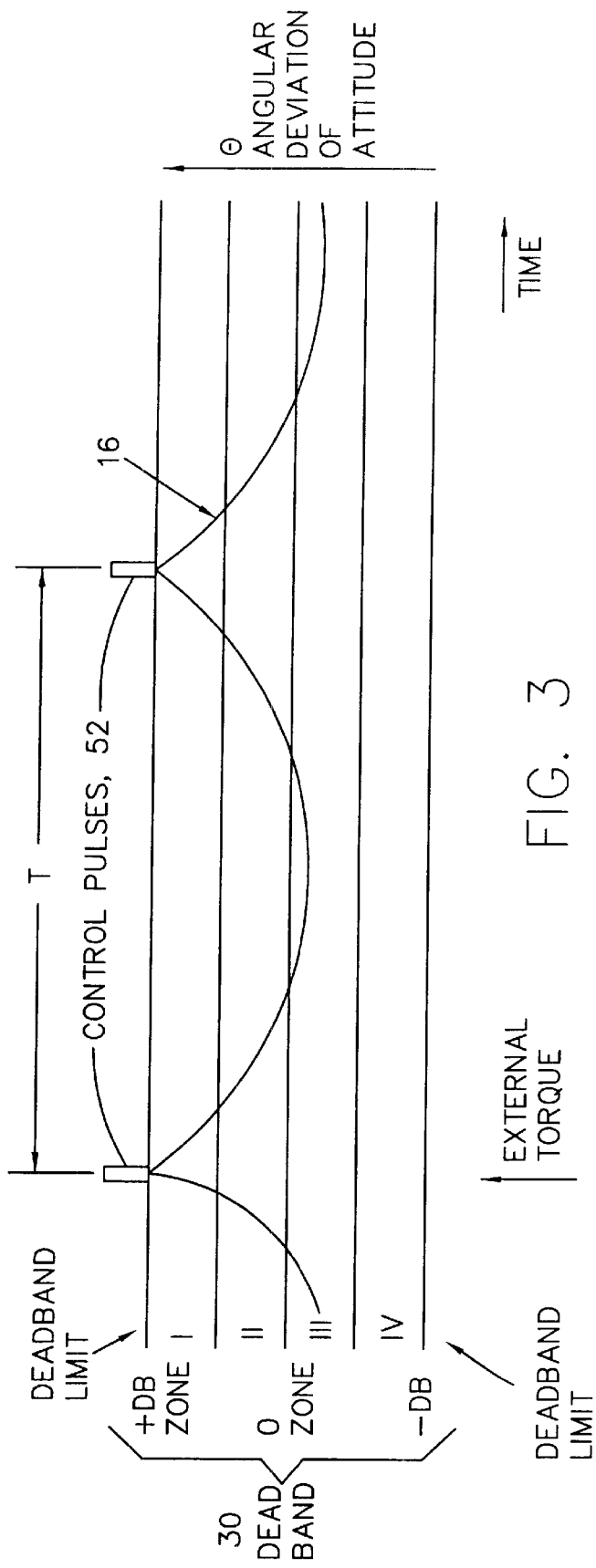
FIG. 3 is a graph of the change in attitude of the spacecraft of FIG. 2 in the case wherein correction of attitude is made only by the use of gas thrusters.

It is generally recognized that some drifting of the spacecraft attitude about the axis 50 may be allowed to occur prior to activation of a thruster to correct the drift or change, also referred to herein as the error, in attitude. Generally, the term "deadband" is used to refer to a range of attitude in which the vehicle can drift. Referring to FIG. 3, a range of attitude values comprising the deadband 80 is shown. The limits or edges of the deadband range 80 are illustrated as +DB and −DB.

Referring to FIGS. 2 and 3, if the spacecraft attitude lies substantially centered within the deadband 80, it may not be necessary to activate a thruster 40. Also, it is generally recognized that excessive activation of a thruster 40 may drive the spacecraft attitude outside of the deadband 80. The pattern of attitude drift, including both orientation and velocity, within the deadband 80 is employed by the invention to operate the gas thrusters 40 in a manner which minimizes the number of opening and closing operations of a valve of a gas thruster 40, these operations forming, respectively, the leading and the trailing edges of the pulses of expelled gas.

The graph of FIG. 3 generally illustrates the attitude error functions describing angular drift in attitude of the spacecraft 20 within the deadband 80. In FIG. 3, the angle Θ of FIG. 2 is shown on the vertical axis and the time of drift (time) is shown on the horizontal axis. The graph of FIG. 3 shows an example of a situation wherein the compressed gas thrusters 40 are employed for correction of spacecraft attitude. The graph generally has the appearance of a scallop. In FIG. 3, it is noted that the graph has a somewhat regular periodicity with a period indicated as T, and the generation of a gas pulse is indicated at 52.

In FIG. 3, for purposes of illustration, the external torque is shown on one side of the deadband 80, the bottom edge −DB, for driving the spacecraft attitude across the deadband in the direction of the disturbances, which direction may be referred to as downstream for ease of reference. Also, for purposes of illustration, the gas pulses 52 are shown on the opposite side of the deadband 80, the top edge +DB, for driving the spacecraft attitude across the deadband 80 in a second direction opposite to the downstream direction, wherein the second direction may be referred to as the upstream direction for ease of reference.

In FIG. 3, each gas pulse 52 exerts a force on the spacecraft over an interval of time producing a force impulse equal to the integral of the product of the force and the time. This imparts an angular momentum to the spacecraft with an angular velocity that directs the spacecraft back towards the bottom edge −DB of the deadband 80.

In FIG. 3, the deadband 80 is shown divided into four zones, I, II, III and IV, and the change in attitude from the desired attitude, or error can be measured from the center of the deadband, denoted as "0".

The duration of a control pulse 52 of the gas is generally very much smaller than the periodicity of the graph in FIG. 3 so that, for purposes of illustration, the change in momentum and angular velocity may be shown as virtually instantaneous. A suitable control system for operation of the thrusters can provide for a sampling of the attitude error function at a rate for example of once per second, though other rates may be used if desired. The minimum duration of a gas pulse 52 can be for example in one embodiment, approximately 30 milliseconds, this being a lower limit based on the switching characteristics of the solenoid valve employed in the thruster 40. In alternate embodiments, the minimum duration of a gas pulse 52 can be any suitable duration depending on the particular design of the system. The control pulses 52 of longer duration are generally employed to impart greater amounts of momentum to the spacecraft. Thus, any desired duration for the control pulse can be used.

It is generally recognized that, in the situation of FIG. 3, knowledge of the period of the graph can be employed for adjusting the impulse, the control pulse 52, provided by the gas thruster 40 of FIG. 2, to keep the spacecraft attitude within the deadband 80. The thruster 40 is fired each time that the attitude error signal 16 reaches the upper edge +DB, or lower edge −DB, of the deadband 80. For illustration purposes, the graph of FIG. 3, only shows the attitude error signal 16 reaching the upper edge +DB of the deadband 80. In the event that the impulse generated by the control pulse 52 provided by the thruster 40 is insufficient to move the attitude error function signal 16 from the top edge +DB towards the bottom edge −DB of the deadband 80, as the attitude of the vehicle changes, the attitude error signal 16 returns to the top edge +DB in less time than that displayed in FIG. 3. This results in an increased pulse frequency and decreased periodicity of the graph. The decrease in the length of the period is observed, and this information is employed to increase of the impulse generated by the control pulse 52 of the thruster 40. In the event that the attitude error function signal 16 moves beyond the bottom edge −DB of the deadband 80, the period of the graph is observed to be excessively long and the control system responds by decreasing the impulse of the thruster. Measurement of the attitude error function signal 16 by the control system also serves to alert the system when the thruster impulse is excessive, this information being available also for establishing a maximum value of thruster impulse.

Referring to FIGS. 1 and 2, in general, the operation of the system 10 comprises inputting a desired attitude and computing the present state of the spacecraft 20, namely, the attitude and angular velocity of the spacecraft 20. The difference between the desired attitude and the present state can be computed with the difference being used to generate a command for activation of the thrusters 40 and torquers 42 to correct the attitude of the spacecraft 20.

Figure 4A:
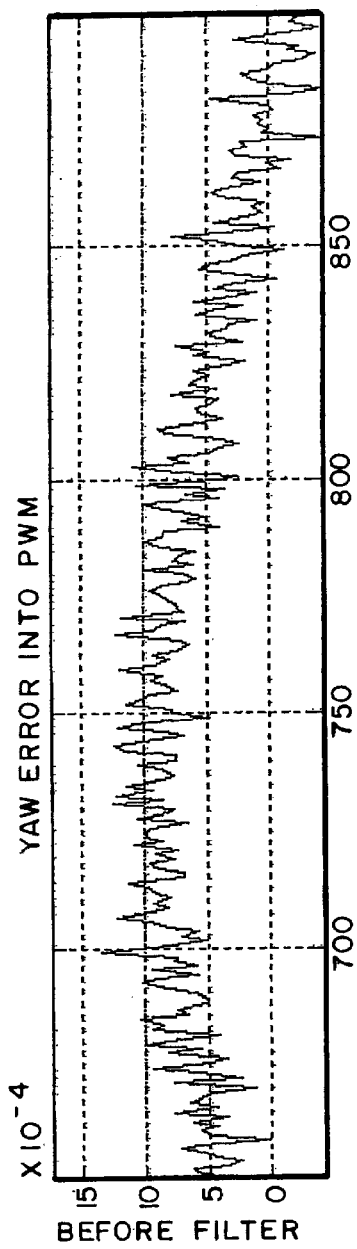
FIG. 4a is a graph illustrating of yaw error behavior before modification by a noise screen incorporating features of the present invention.
Figure 5A:
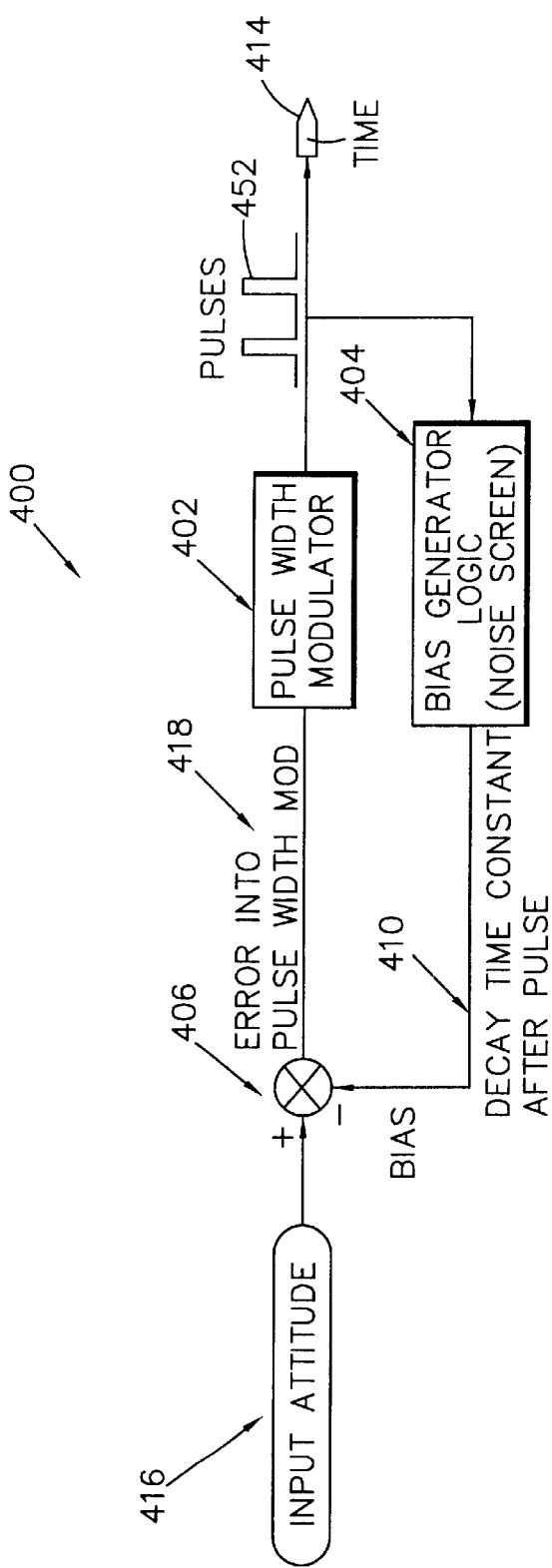
FIG. 5A is a block diagram of control system including a noise screen incorporating features of the present invention.
Figure 5B:
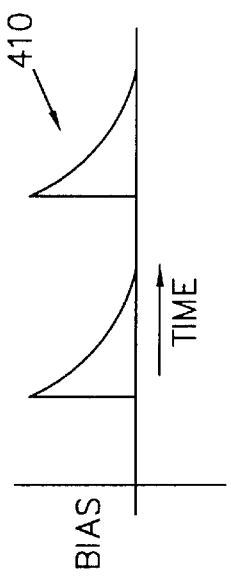
FIG. 5B is a graph illustrating a noise screen signal.

The system 10 is generally able to stabilize the attitude of the spacecraft 20 and to maintain the spacecraft attitude within a desired band, namely the deadband, centered on the desired attitude. In addition, the system 10 is adapted to minimize the number of opening and closure operations of the solenoid valve of the thruster 40 by generating a noise screen signal in response to a control pulse 52. Referring to FIGS. 5A and 5B, the noise screen signal 410 is a decaying offset signal into the pulse modulator 402 together with the attitude input error signal 416. The attitude input error signal can include a certain amount of noise on the signal as is shown in FIG. 4A. Referring to FIG. 5A, the noise screen system 400 generally includes a logic circuit or device 404 that generates a signal function 410 that can be added to the nominal input attitude control signal 416. The signal function 410 is generally adapted to provide a step away from the deadband limit, which can be either the edge +DB or −DB of FIG. 3. The step is maintained, but decays with a time constant that eliminates the signal function 410 in subsequent time as shown in the graph of FIG. 5B.

The pulses 452 are generated when the change in attitude of the vehicle represented by signal 416 exceeds a deadband value or limit. The presence of noise on the attitude error signal 416 can cause the execution of multiple pulses 452 when the change in attitude of the vehicle, represented by the signal 416 is near a limit or edge of the deadband. These multiple pulses 452 can over accelerate the aircraft into an undesired motion and can cause excessive limit cycle mass usage. The noise screen system 400 biases the input attitude signal 416 before going into the deadband. The present invention generally avoids signal bandwidth limiting that would delay attitude processing. The common practice of signal filtering to attenuate noise can jeopardize system stability. The noise screen system of the present invention does not adversely impact system stability.

The noise screen system 14 shown in FIG. 1 effectively filters the noise effects from the attitude input error signal 16 and prevents excessive pulsing or activation of the thruster 40 shown in FIG. 2. Referring to FIG. 5B, the noise screen signal 410 is at the outset, a step offset that exponentially decays to zero over time. Any subsequent control pulses 452 generate additional superposed decaying functions 410. The noise screen signal 410 is generally adapted to offset the input attitude error signal 416 away from the deadband threshold, either +DB or −DB of FIG. 3, and impede further pulsing in a time period following an initial control pulse 452. The resultant signal 418, formed by the combination of the attitude input pulse 416 and the noise screen pulse 410, is fed into the pulse width modulator 402 to generate the control pulses 452.

The general characteristics of the noise screen signal function 410 shown in FIG. 5B are the magnitude of the offset or bias and the exponential decay time constant. The offset is represented on the vertical axis and the time is represented on the horizontal axis. The magnitude of the offset can generally be in the range of 15% to 30% of the deadband range. The exponential decay time constant is design dependent and a fraction of the time scale period, T, in FIG. 3. Generally, the time constant can be in the range of 20–100 seconds and is preferably 50 seconds. In alternate embodiments the exponential decay time constant can be any desired time constant.

Figure 4B:
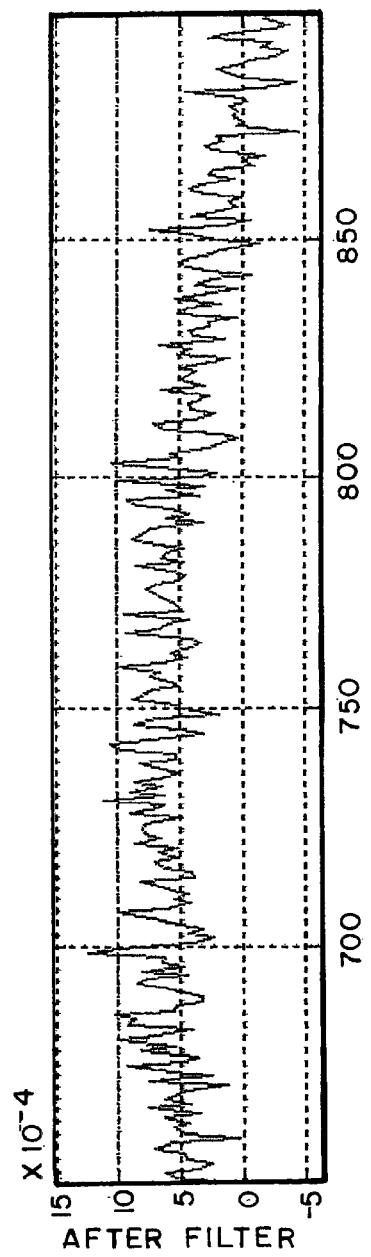
FIG. 4b is a graph of yaw error behavior after modification by a noise screen incorporating features of the present invention illustrating a reduction in thruster firings due to noise on the input control signal.
Figure 4C:
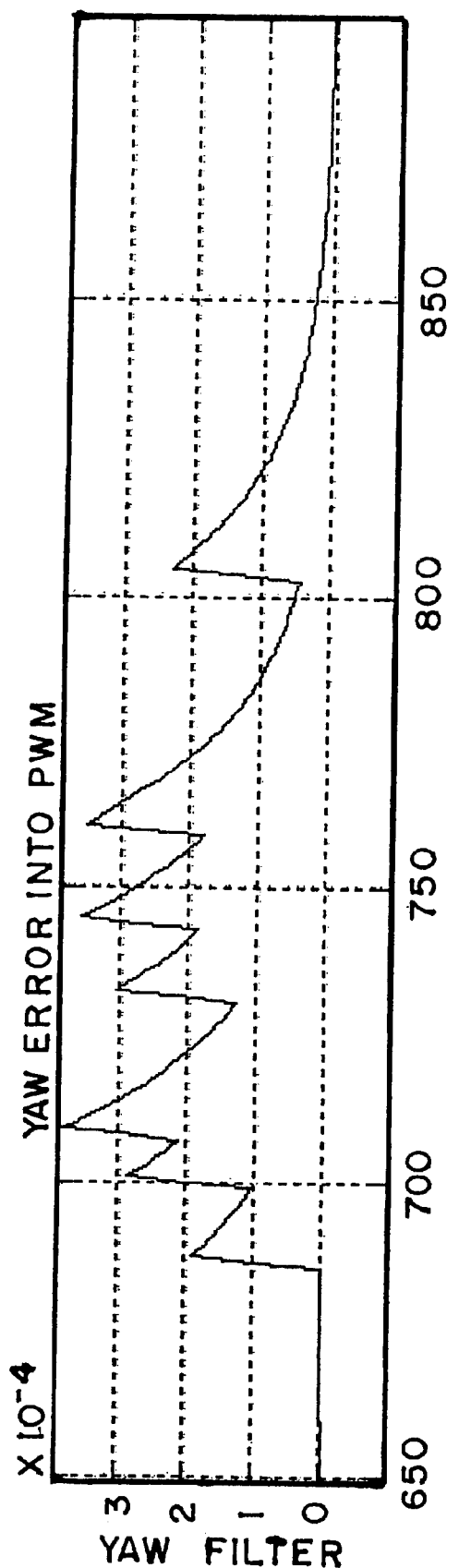
FIG. 4c is a graph illustrating the noise screen output control signal for the plot of FIG. 3b.

Referring to FIGS. 4A, 4B, and 4C, an example of yaw error signal behavior for a vehicle such as a spacecraft is shown. FIG. 4A illustrates a yaw error signal 470 representing an attitude change signal 16 of FIG. 1 before application of the noise screen system 14. i. FIG. 4B illustrates the yaw error signal 480 after modification by the noise screen system 14. FIG. 4C illustrates a noise screen signal 490 generated by the noise screen system.

In FIGS. 4A and 4B, the range of the deadband is approximately $+/-10 \times 10^{-4}$, or 1 milli-radian (0.001 radian). For illustration purposes, only one edge of the limit is shown at 450. Referring to FIG. 4A., without modification of the noise screen system 14, the noise on the yaw signal 470 exceeds or crosses the limit or edge 450 of the deadband range often. Generally, each crossing of the deadband results in the generation of a control pulse 52 and the activation of a vehicle thruster. As shown in FIG. 4B, after modification by the noise screen system 14, the yaw signal 480 crosses or exceeds the limit 450 of the deadband considerably fewer times. Thus, the number of control pulses 52 called for by the system 10 of FIG. 1 is reduced. FIG. 4C illustrates a noise screen signal 490, or series of noise screen signals, each noise screen signal 490 represented by a peak 475, that is generated in response to the yaw error signal 470 of FIG. 4A. Generally, a noise screen pulse 475 is generated at approximately each crossing of the deadband limit 450 by the signal 470. As shown in FIG. 4C, the magnitude of each noise screen signal can vary from under $2 \times 10^{-4}$ to over $3 \times 10^{-4}$.

Figure 6:
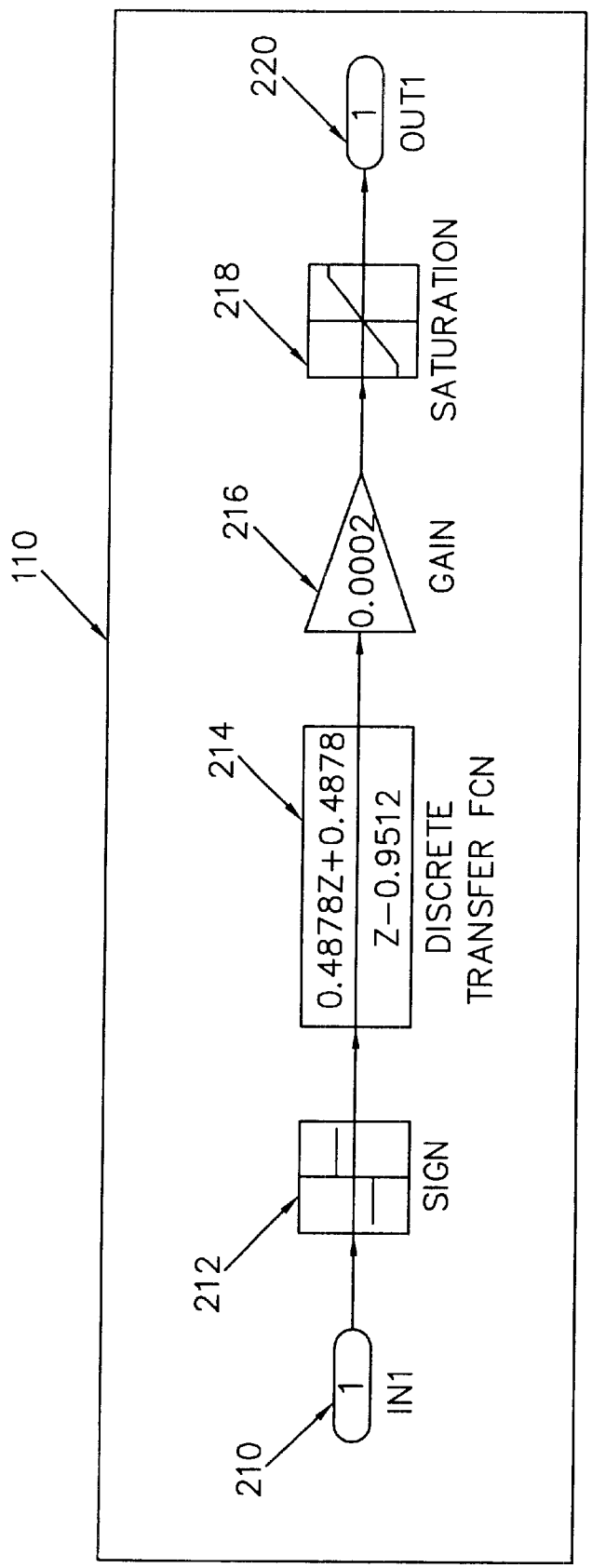
FIG. 6 is a block diagram of one embodiment of a noise screen incorporating features of the present invention.

Referring to FIG. 6, a schematic diagram illustrating a system that can be used to practice the present invention is shown. Generally, FIG. 6 illustrates the functional components for one embodiment of a noise screen system 14 of FIG. 1. The inputs 210 to the circuit 110 are the control pulses generated when an attitude error signal exceeds a deadband range or limit. Device 212 is generally adapted to generate the sign of the input signal, +/− one, or a zero for a zero in, and generates a unit value of the same sign of the control pulse. The sign function of device 212 goes into the device 214 that generates a signal as a function of time. Device 214 is the discrete transfer function that generates the decaying pulse or pulses. The noise screen signal or function is a decaying function of time. At the instant of the control pulse 52, the noise screen signal starts at a value (unity) and decays at a stipulated time constant. Subsequent input pulses or control pulses generate additional decaying noise screen signals that are additive to the previous responses. The gain 216 scales the pulse size and the limiter 218 caps the magnitude of the noise screen output signal 410 shown in FIG. 5B. After the scaling gain device 216, the shaped noise screen pulses are limited at a stipulated saturation level. The output 220 of the circuit 110 is subtracted from the attitude error input signal that reduces the net attitude input error signal away from the edge of the deadband. This reduction in attitude error input signal delays further control pulse generation. Referring to FIG. 5A, the noise screen signal 410, formed for example by the circuit 110 of FIG. 6, is subtracted from the attitude error input signal 416 and results in a net attitude error input signal 418.

The attitude control system of the present invention is able to provide for a smooth consistent control of the spacecraft attitude while effectively filtering the noise effects and preventing excessive gas pulsing. The reduction in response to signal noise controls limit cycle behavior and improves fuel usage and minimizes gas pulses in dead-band mass expulsion attitude control system.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An attitude control system comprising:
    a controller for controlling an attitude of a vehicle carrying an actuator system, the actuator system adapted to pulse in metered bursts in order to generate a control torque to control the attitude of the vehicle in response to a control pulse; and
    a noise screen device coupled to the controller for receiving an attitude input error signal, the noise screen device adapted to generate a noise screen signal in response to the control pulse, the control pulse being generated when said attitude input error signal exceeds a predetermined deadband level, the noise screen signal comprising a decaying offset signal that when combined with the attitude error input signal results in a net attitude error input signal away from the predetermined deadband level to reduce further control pulse generation.

2. The system of claim 1 wherein the noise screen signal is a step offset signal that exponentially decays to zero.

3. The system of claim 1 wherein the noise screen signal is adapted to offset the attitude error input signal away from a deadband threshold attitude level and impede further pulsing in a time period immediately following an initial pulse initiation.

4. The system of claim 1 wherein a magnitude of an offset of the noise screen signal is in the range of 15% to 30% of a deadband value.

5. The system of claim 1 wherein an exponential decay time constant of the noise screen signal is in the range of 10 to 100 seconds.

6. The system of claim 1 wherein the actuator system is a thruster, the thruster including a valve enabling the formation of pulses of expelled gas from a source of compressed gas.

7. The system of claim 1 wherein the actuator system is a thruster and a modulator logic device is adapted to control a driver for driving the thruster to expel a succession of pulses of gas, wherein an individual one of the pulses of gas provides a force impulse which urges the vehicle toward a desired attitude different from a first attitude with the vehicle drifting back towards the first attitude during an interval of time between successive ones of the gas pulses.

8. The system of claim 1 wherein the vehicle is a spacecraft.

9. The system of claim 1 wherein the controller further includes a modulator logic device adapted to generate the control pulse.

10. A method of reducing an undesirable response to signal noise for a mass expulsion spacecraft control system comprising the steps of:
    generating a noise screen signal in response to an initial attitude control pulse, the noise screen signal comprising a decaying offset signal that when combined with an attitude error input signal results in a net attitude error input signal away from the predetermined deadband level to reduce further control pulse generation;
    combining the noise screen signal with the attitude error input signal; and
    generating subsequent attitude control pulse based on the combined noise screen signal and attitude error input signal, wherein each subsequent control pulse is adapted to generate additional superposed decaying functions.

11. The method of claim 10 wherein the step of generating a noise screen signal in response to an initial attitude control pulse further comprises the step of forming the initial attitude control pulse in a modulator logic when an attitude error input signal exceeds a preset deadband level.

12. The method of claim 10 wherein the step of generating the noise screen signal further comprises the step of generating an initial noise screen signal that at the outset is a step offset that exponentially decays to zero.

13. The method of claim 10 wherein the step of generating a noise screen signal further comprises the step of offsetting the attitude error input signal away from a deadband threshold and impeding the generation of subsequent control pulses in a time period immediately following an initial pulse generation.

* * * * *